United States Patent
Huang et al.

(10) Patent No.: US 12,381,405 B2
(45) Date of Patent: Aug. 5, 2025

(54) METHOD FOR CHARGING POWER BATTERY AND BATTERY MANAGEMENT SYSTEM

(71) Applicant: CONTEMPORARY AMPEREX TECHNOLOGY (HONG KONG) LIMITED, Hong Kong (CN)

(72) Inventors: Shan Huang, Ningde (CN); Guangyu Xu, Ningde (CN); Wei Zhao, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 65 days.

(21) Appl. No.: 18/343,026

(22) Filed: Jun. 28, 2023

(65) Prior Publication Data
US 2024/0022092 A1 Jan. 18, 2024

Related U.S. Application Data

(63) Continuation of application No. PCT/CN2021/133265, filed on Nov. 25, 2021.

(51) Int. Cl.
*H02J 7/00* (2006.01)
*B60L 53/62* (2019.01)
(Continued)

(52) U.S. Cl.
CPC ............ *H02J 7/0029* (2013.01); *B60L 53/62* (2019.02); *B60L 58/12* (2019.02); *B60L 58/16* (2019.02);
(Continued)

(58) Field of Classification Search
CPC .. H02J 7/0029; H02J 7/007194; H02J 7/0048; H02J 7/005; H02J 7/00712;
(Continued)

(56) References Cited

U.S. PATENT DOCUMENTS

| | | | |
|---|---|---|---|
| 10,752,123 B2 * | 8/2020 | Patil | B60L 53/63 |
| 11,130,421 B2 * | 9/2021 | Marcial-Simon | B60L 53/305 |

(Continued)

FOREIGN PATENT DOCUMENTS

| | | |
|---|---|---|
| CN | 107516750 A | 12/2017 |
| CN | 107710545 A | 2/2018 |

(Continued)

OTHER PUBLICATIONS

Extended European Search Report for EP application No. 21965148.6, dated Apr. 8, 2024.
(Continued)

*Primary Examiner* — Alexis B Pacheco
(74) *Attorney, Agent, or Firm* — Ladas & Parry LLP

(57) ABSTRACT

Embodiments of the present application provide a method for charging a power battery and a battery management system, which can effectively improve the charging speed of the power battery on the basis of ensuring the safety performance of the power battery. The method for charging a power battery is applied to a battery management system for the power battery. The method includes: determining a negative electrode potential safety threshold according to a battery state parameter of the power battery, the battery state parameter comprising at least one of the state of charge (SOC), the temperature, and the state of health (SOH) of the power battery; and adjusting a charging request current for the power battery based on a negative electrode potential of the power battery and the negative electrode potential safety threshold during a charging process for the power battery.

13 Claims, 4 Drawing Sheets

(51) Int. Cl.
- *B60L 58/12* (2019.01)
- *B60L 58/16* (2019.01)
- *B60L 58/24* (2019.01)
- *H01M 10/42* (2006.01)
- *H01M 10/44* (2006.01)
- *H01M 10/48* (2006.01)
- *H02J 7/14* (2006.01)

(52) U.S. Cl.
CPC ........... *B60L 58/24* (2019.02); *H01M 10/425* (2013.01); *H01M 10/443* (2013.01); *H01M 10/486* (2013.01); *H02J 7/0048* (2020.01); *H02J 7/005* (2020.01); *H02J 7/00712* (2020.01); *H02J 7/007194* (2020.01); *B60L 2240/545* (2013.01); *H01M 2010/4271* (2013.01); *H01M 2220/20* (2013.01)

(58) Field of Classification Search
CPC .......... B60L 53/62; B60L 58/12; B60L 58/16; B60L 58/24
USPC ......................................................... 320/134
See application file for complete search history.

(56) References Cited

U.S. PATENT DOCUMENTS

| | | | |
|---|---|---|---|
| 11,411,402 B1* | 8/2022 | Singh | G06Q 50/06 |
| 11,502,529 B2* | 11/2022 | Tseng | H02J 7/00714 |
| 12,068,603 B2* | 8/2024 | Lee | H02J 7/0071 |
| 2018/0123354 A1 | 5/2018 | Lim et al. | |
| 2018/0292461 A1 | 10/2018 | Kim et al. | |
| 2021/0170903 A1* | 6/2021 | Tsuchiya | H02J 7/00034 |
| 2021/0210971 A1 | 7/2021 | Lim et al. | |
| 2021/0284039 A1* | 9/2021 | Ando | H04W 4/44 |
| 2021/0325069 A1* | 10/2021 | Cotton | F24F 5/0021 |

FOREIGN PATENT DOCUMENTS

| | | |
|---|---|---|
| CN | 111082173 A | 4/2020 |
| CN | 112038719 A | 12/2020 |
| CN | 112615075 A | 4/2021 |
| JP | 2012049040 A | 3/2012 |
| JP | 2013171691 A | 9/2013 |
| JP | 2018082613 A | 5/2018 |
| JP | 2020162216 A | 10/2020 |
| KR | 20170116816 A | 10/2017 |
| KR | 20210098215 A | 8/2021 |
| WO | 2021035736 A1 | 3/2021 |

OTHER PUBLICATIONS

Notice of Reasons for Refusal (First Office Action) of JP application No. 2023-541352, dated Jun. 24, 2024.
International Search Report for International Application No. PCT/CN2021/133265, mailed Aug. 26, 2022.
Written Opinion of International Searching Authority for International Application No. PCT/CN2021/133265, mailed Aug. 26, 2022.
Notice of Allowance for KR application No. 10-2023-7022511, dated Feb. 10, 2025.

* cited by examiner

METHOD FOR CHARGING POWER BATTERY AND BATTERY MANAGEMENT SYSTEM

CROSS REFERENCE TO RELATED APPLICATION

This application is a continuation of International Patent Application No. PCT/CN2021/133265, filed on Nov. 25, 2021, which is incorporated by reference in its entirety.

TECHNICAL FIELD

The present application relates to the field of power batteries, and in particular to a method for charging a power battery and a battery management system.

BACKGROUND

With the development of the times, electric vehicles, due to their high environmental protection, low noise, low cost of use and other advantages, have a huge market prospect and can effectively promote energy saving and emission reduction, which is beneficial to the development and progress of society.

At present, consumers have increasingly high requirements for the charging speed of electric vehicles. However, as the charging speed increases, the safety performance of the batteries of electric vehicles may be affected. For electric vehicles and their related fields, the battery technology is an important factor in their development, especially the safety performance of batteries, which affects the development and application of battery-related products and affects the public's acceptance of electric vehicles. Therefore, how to balance the charging speed and the safety performance of the battery is an urgent problem to be solved.

SUMMARY

Embodiments of the present application provide a method for charging a power battery and a battery management system, which can effectively improve the charging speed of the power battery on the basis of ensuring the safety performance of the power battery.

In a first aspect, a method for charging a power battery is provided, which is applied to a battery management system for the power battery, the method including: determining a negative electrode potential safety threshold according to a battery state parameter of the power battery, the battery state parameter comprising at least one of the state of charge (SOC), the temperature, and the state of health (SOH) of the power battery; and adjusting a charging request current for the power battery based on a negative electrode potential of the power battery and the negative electrode potential safety threshold during a charging process for the power battery.

Since the risk level of lithium plating of the power battery is closely related to its own battery state parameter, the above technical solution determines the negative electrode potential safety threshold according to the battery state parameter of the power battery, so that the determined negative electrode potential safety threshold can be more accurate and closer to the critical potential of lithium plating of the power battery. In this way, the charging request current for the power battery is adjusted based on the determined negative electrode potential safety threshold and the negative electrode potential of the power battery, which not only ensures the safety performance of the power battery, but also improves the charging speed of the power battery.

In some possible implementations, said adjusting a charging request current for the power battery based on a negative electrode potential of the power battery and the negative electrode potential safety threshold comprises: adjusting the charging request current from a first charging request current to a second charging request current if the negative electrode potential drops to the negative electrode potential safety threshold, the second charging request current being less than the first charging request current.

In the above technical solution, when the negative electrode potential of the power battery drops to the negative electrode potential safety threshold, it indicates that this power battery may be about to experience lithium plating, and reducing the charging request current for the power battery in this case can avoid the safety problem of the power battery caused by lithium ion aggregation and other problems, such as battery combustion or explosion, thus ensuring the safety performance of the power battery.

In some possible implementations, said adjusting a charging request current for the power battery based on a negative electrode potential of the power battery and the negative electrode potential safety threshold comprises: adjusting the charging request current from a first charging request current to a third charging request current if the negative electrode potential does not drop to the negative electrode potential safety threshold and a charging duration of the power battery is greater than a time threshold, the third charging request current being greater than the first charging request current.

In the above technical solution, if the negative electrode potential of the power battery does not drop to the negative electrode potential safety threshold for a long time, it indicates that the charging current for the power battery for the current moment is too small. Increasing the charging request current for the power battery in this case can increase the charging speed and greatly reduce the charging duration of the power battery, thereby improving the user experience.

In some possible implementations, when the SOC of the power battery is in a first SOC interval, the negative electrode potential safety threshold is a first preset negative electrode potential safety threshold; and when the SOC of the power battery is in a second SOC interval, the negative electrode potential safety threshold is a second preset negative electrode potential safety threshold, wherein SOCs in the first SOC interval are less than SOCs in the second SOC interval, and the first preset negative electrode potential safety threshold is less than the second preset negative electrode potential safety threshold.

Since the larger the SOC of the power battery, the higher the risk of lithium plating of the power battery, on the one hand, the negative electrode potential safety threshold corresponding to the power battery with high risk of lithium plating is set relatively large, which can effectively suppress the risk of lithium plating of the power battery and thus improve the safety performance of the power battery; on the other hand, the above technical solution sets the negative electrode potential safety threshold corresponding to the power battery with low risk of lithium plating to be relatively small, which can ensure the charging speed of the power battery without affecting the safety performance of the power battery.

In some possible implementations, when the temperature of the power battery is in a first temperature interval, the negative electrode potential safety threshold is a third preset negative electrode potential safety threshold; and when the temperature of the power battery is in a second temperature interval, the negative electrode potential safety threshold is a fourth preset negative electrode potential safety threshold, wherein temperatures in the first temperature interval are less than temperatures in the second temperature interval, and the third preset negative electrode potential safety threshold is greater than the fourth preset negative electrode potential safety threshold.

Since the lower the temperature of the power battery, the higher the risk of lithium plating of the power battery, on the one hand, the negative electrode potential safety threshold corresponding to the power battery with high risk of lithium plating is set relatively large, which can effectively suppress the risk of lithium plating of the power battery and thus improve the safety performance of the power battery; on the other hand, the above technical solution sets the negative electrode potential safety threshold corresponding to the power battery with low risk of lithium plating to be relatively small, which can ensure the charging speed of the power battery without affecting the safety performance of the power battery.

In some possible implementations, when the SOH of the power battery is in a first SOH interval, the negative electrode potential safety threshold is a fifth preset negative electrode potential safety threshold; and when the SOH of the power battery is in a second SOH interval, the negative electrode potential safety threshold is a sixth preset negative electrode potential safety threshold, wherein SOHs in the first SOH interval are less than SOHs in the second SOH interval, and the fifth preset negative electrode potential safety threshold is greater than the sixth preset negative electrode potential safety threshold.

Since the smaller the SOH of the power battery, the higher the risk of lithium plating of the power battery, on the one hand, the negative electrode potential safety threshold corresponding to the power battery with high risk of lithium plating is set relatively large, which can effectively suppress the risk of lithium plating of the power battery and thus improve the safety performance of the power battery; on the other hand, the above technical solution sets the negative electrode potential safety threshold corresponding to the power battery with low risk of lithium plating to be relatively small, which can ensure the charging speed of the power battery without affecting the safety performance of the power battery.

In some possible implementations, the battery state parameter of the power battery is a battery state parameter of the power battery before charging.

In the above technical solution, the BMS determines the battery state parameter of the power battery before the power battery is charged, that is, the BMS is able to determine the negative electrode potential safety threshold before the power battery is charged. In this way, from the moment the power battery starts to be charged, the BMS can adjust the charging request current for the power battery according to the negative electrode potential safety threshold, which enables the BMS to adjust the charging request current throughout the whole charging process for the power battery, thus making it possible to further ensure the safety performance of the power battery and further improve the charging speed of the power battery.

In some possible implementations, the battery state parameter of the power battery is a battery state parameter of the power battery during the charging process.

In the above technical solution, the BMS determines the battery state parameter of the power battery during the charging process. Since the battery state parameter of the power battery may be constantly changing in the charging process, the determined battery state parameter may be the parameter closest to the actual battery state parameter of the power battery for the current moment, thereby making the negative electrode potential safety threshold determined by the BMS according to the latest battery state parameter of the power battery more accurate.

In a second aspect, a battery management system for a power battery is provided, comprising: a determination unit for determining a negative electrode potential safety threshold according to a battery state parameter of the power battery, the battery state parameter comprising at least one of the state of charge (SOC), the temperature, and the state of health (SOH) of the power battery; and an adjustment unit for adjusting a charging request current for the power battery based on a negative electrode potential of the power battery and the negative electrode potential safety threshold during a charging process for the power battery.

In some possible implementations, the adjustment unit is specifically used for: adjusting the charging request current from a first charging request current to a second charging request current if the negative electrode potential drops to the negative electrode potential safety threshold, the second charging request current being less than the first charging request current.

In some possible implementations, the adjustment unit is specifically used for: adjusting the charging request current from a first charging request current to a third charging request current if the negative electrode potential does not drop to the negative electrode potential safety threshold and a charging duration of the power battery is greater than a time threshold, the third charging request current being greater than the first charging request current.

In some possible implementations, wherein when the SOC of the power battery is in a first SOC interval, the negative electrode potential safety threshold is a first preset negative electrode potential safety threshold; and when the SOC of the power battery is in a second SOC interval, the negative electrode potential safety threshold is a second preset negative electrode potential safety threshold, wherein SOCs in the first SOC interval are less than SOCs in the second SOC interval, and the first preset negative electrode potential safety threshold is less than the second preset negative electrode potential safety threshold.

In some possible implementations, when the temperature of the power battery is in a first temperature interval, the negative electrode potential safety threshold is a third preset negative electrode potential safety threshold; and when the temperature of the power battery is in a second temperature interval, the negative electrode potential safety threshold is a fourth preset negative electrode potential safety threshold, wherein temperatures in the first temperature interval are less than temperatures in the second temperature interval, and the third preset negative electrode potential safety threshold is greater than the fourth preset negative electrode potential safety threshold.

In some possible implementations, when the SOH of the power battery is in a first SOH interval, the negative electrode potential safety threshold is a fifth preset negative electrode potential safety threshold; and when the SOH of the power battery is in a second SOH interval, the negative electrode potential safety threshold is a sixth preset negative electrode potential safety threshold, wherein SOHs in the first SOH interval are less than SOHs in the second SOH interval, and the fifth preset negative electrode potential safety threshold is greater than the sixth preset negative electrode potential safety threshold.

In some possible implementations, the battery state parameter of the power battery is a battery state parameter of the power battery before charging.

In some possible implementations, the battery state parameter of the power battery is a battery state parameter of the power battery during the charging process.

In a third aspect, a battery management system (BMS) for a power battery is provided, comprising: a memory for storing a program; and a processor for executing the program stored in the memory, wherein the program stored in the memory is executed, the processor is used to execute the method in the first aspect above or in each of its implementations.

BRIEF DESCRIPTION OF DRAWINGS

In order to more clearly illustrate the technical solutions of embodiments of the present application, the following is a brief description of the accompanying drawings to be used in the embodiments of the present application. It is obvious that the accompanying drawings described below are only some embodiments of the present application, and other accompanying drawings can be obtained according to the accompanying drawings without any creative work for a person of ordinary skill in the art.

DETAILED DESCRIPTION

Embodiments of the present application will be described in further detail hereinafter in conjunction with the accompanying drawings and embodiments. The following detailed description of the embodiments and the drawings are used to illustrate the principles of the present application by way of example, but should not be used to limit the scope of the present application, that is, the present application is not limited to the described embodiments. In the description of the present application, it should be noted that, unless otherwise stated, "plurality of" means two or more; the orientation or positional relationships indicated by the terms "upper", "lower", "left", "right", "inner" and "outer" are only for facilitating the description of the present application and simplifying the description, rather than indicating or implying that the apparatus or element referred to must have a particular orientation or be constructed and operated in a particular orientation, and therefore will not be interpreted as limiting the present application. In addition, the terms "first", "second" and "third" are only used for descriptive purposes, and cannot be construed as indicating or implying relative importance.

In the field of new energy, power batteries can be used as the main power source for electrical apparatuses (e.g., vehicles, ships or spacecraft, and so on). At present, the power batteries on the market are mostly rechargeable storage batteries, and the most common ones are lithium batteries, such as lithium-ion batteries or lithium-ion polymer batteries, and the like. In the charging process, the power battery is generally charged by means of continuous charging, and continuous charging of the power battery will cause the occurrence of lithium plating and heating of the power battery, among which, the lithium plating and heating will not only degrade the performance of the power battery and significantly shorten the cycle life, but also limit the fast charging capacity of the power battery and may cause disastrous consequences such as combustion and explosion, resulting in serious safety problems.

In order to ensure the safety performance of the power battery, reducing the charging current during the charging process of the power battery is an extremely effective method. However, at present, consumers have increasingly high requirements for the charging speed of power batteries. If the charging current for the power battery is blindly reduced to ensure the safety performance of the power battery, the charging speed of the power battery will be caused to be lower, which will affect the user experience.

In view of this, the present application proposes a new method for charging a power battery, which can balance the charging speed and the safety performance of the power battery, that is, it can effectively improve the charging speed of the power battery on the basis of ensuring the safety performance of the power battery.

Figures 1, 2:
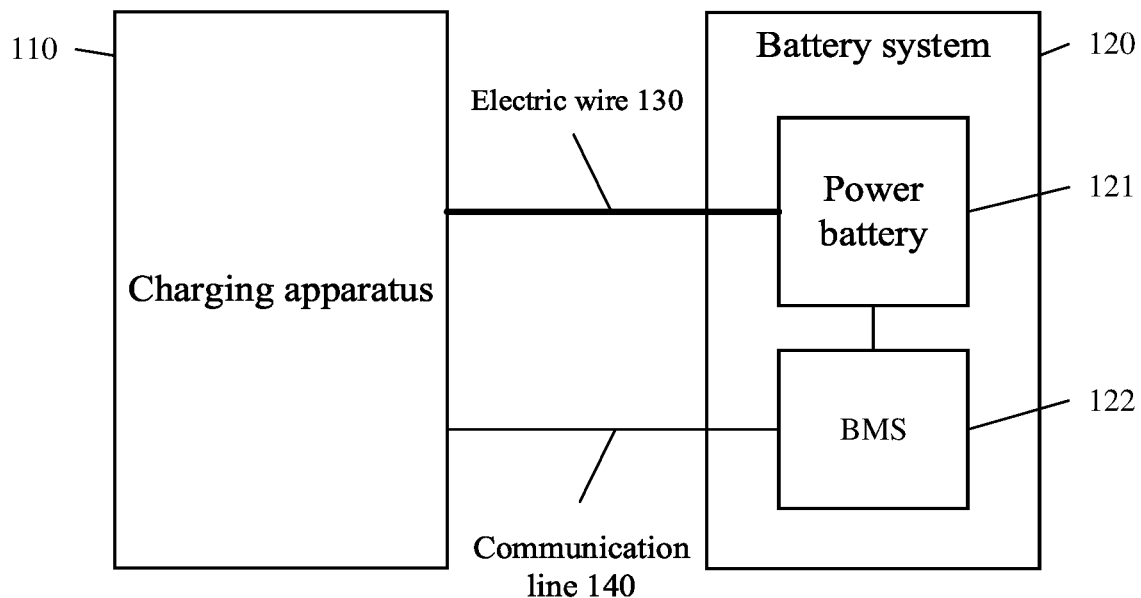
FIG. 1 is an architecture diagram of a charging system to which an embodiment of the present application applies.
FIG. 2 is a schematic diagram of a method for charging a power battery of an embodiment of the present application.

FIG. 1 illustrates an architecture diagram of a charging system to which an embodiment of the present application applies.

As shown in FIG. 1, the charging system 100 may include: a charging apparatus 110 and a battery system 120. Optionally, the battery system 120 may be a battery system in an electric vehicle (including all-electric vehicles and pluggable hybrid electric vehicles) or a battery system in other application scenarios.

Optionally, the battery system 120 may be provided with at least one battery pack, and the at least one battery pack as a whole may be collectively referred to as the power battery 121. In terms of the type of the battery, this power battery 121 may be any type of battery, including but not limited to: lithium-ion battery, lithium metal battery, lithium sulfur battery, lead acid battery, nickel cadmium battery, nickel metal hydride battery, or lithium air battery and the like. In terms of the scale of the battery, the power battery 121 in the embodiments of the present application may be a battery cell/cell, or a battery module or a battery pack, wherein the battery module or battery pack may be formed by multiple batteries connected in series and in parallel. In the embodiments of the present application, no specific limitation is imposed on the specific type and scale of the power battery 121.

In addition, in order to intelligently manage and maintain the power battery 121, to prevent the power battery 121 from overcharging and overdischarging, and to extend the service life of the battery, the battery system 120 is generally provided with a battery management system (BMS) 122 for implementing functions of charge and discharge management, high-voltage control, battery protection, battery data collection, battery state evaluation, and the like. Optionally, the BMS 122 may be integrated with the power battery 121 in the same device or apparatus, or the BMS 122 may be provided outside the power battery 121 as an independent device or apparatus.

The charging apparatus 110 can output charging power to charge the power battery 121 in accordance with the charging requirement of the BMS 122. For example, the charging apparatus 110 can output a voltage and a current in accordance with the required voltage and the required current sent by the BMS 122. Optionally, the charging apparatus 110 in embodiments of the present application may be a charging pile, also referred to as a charger. The charging pile here may be, for example, a normal charging pile, a super charging pile, a charging pile supporting a vehicle to grid (V2G) mode, or the like.

As shown in FIG. 1, the charging apparatus 110 may be connected to the power battery 121 via an electric wire 130 and to the BMS 122 via a communication line 140, where the communication line 140 is used to achieve information interaction between the charging apparatus 110 and the BMS. As an example, the communication line 140 includes, but is not limited to, a control area network (CAN) communication bus or a daisy chain communication bus.

The charging apparatus 110 may communicate with the BMS 122 via a wireless network in addition to communicating with the BMS 122 via the communication line 140. Embodiments of the present application do not specifically limit either the type of wired communication or the type of wireless communication between the charging apparatus 110 and the BMS 122.

FIG. 2 illustrates a schematic diagram of a method 200 for charging a power battery of an embodiment of the present application. The method 200 may be performed by a BMS, and the BMS may be, for example, the BMS 122 in FIG. 1. The method 200 may include at least some of the following contents.

In step S210, a negative electrode potential safety threshold is determined according to a battery state parameter of the power battery.

In step S220, a charging request current for the power battery is adjusted based on a negative electrode potential (or called anode potential) of the power battery and the negative electrode potential safety threshold during a charging process for the power battery.

Among them, the battery state parameter of the power battery may include, but is not limited to, the state of charge (SOC), the temperature, and the state of health (SOH) of the power battery. The SOC can be used to indicate the remaining capacity of the power battery, which is numerically defined as the ratio of the current remaining capacity of the power battery to the total available capacity, and is commonly expressed as a percentage. Specifically, when SOC=100%, it means that the power battery is completely fully charged; and conversely, when SOC=0%, it means that the power battery is completely discharged. The SOH can be used to indicate the aging state of the power battery, which can also be understood as the remaining life of the power battery. After a long period of operation, the performance of the power battery will continue to decay, so the remaining life will be shorter, that is, the SOH value will be smaller. The smaller the SOH, the higher the risk of lithium plating of the power battery.

Optionally, the method 200 may also include: the BMS acquires the battery state parameter of the power battery.

The battery state parameter of the power battery may be the battery state parameter of the power battery before charging. That is, before the power battery is charged, the BMS acquires the battery state parameter of the power battery and determines the negative electrode potential safety threshold based on the battery state parameter. After that, during the whole charging process, the BMS no longer acquires the battery state of the power battery, and the negative electrode potential safety threshold no longer changes.

In this way, from the moment the power battery starts to be charged, the BMS can adjust the charging request current for the power battery according to the negative electrode potential safety threshold, which enables the BMS to adjust the charging request current throughout the whole charging process for the power battery, thus making it possible to further ensure the safety performance of the power battery and further improve the charging speed of the power battery.

Alternatively, the battery state parameter of the power battery may be the battery state parameter of the power battery during the charging process. That is, during the charging process for the power battery, the BMS can acquire the battery state parameter of the power battery in real time.

Here, the BMS can periodically acquire the battery state parameter of the power battery during the charging process for the power battery. For example, during the charging process for the power battery, the BMS can acquire the battery state parameter of the power battery every 5s.

Alternatively, during the charging process for the power battery, the BMS can acquire the battery state parameter of the power battery once every time the battery state parameter of the power battery changes.

Since the battery state parameter of the power battery may be constantly changing during the charging process, in the above technical solution, the BMS determines the battery state parameter of the power battery during the charging process, so that the determined battery state parameter may be the parameter closest to the actual battery state parameter of the power battery for the current moment, thus making the negative electrode potential safety threshold determined by the BMS according to the latest battery state parameter of the power battery more accurate, which can further improve the charging speed of the battery effectively on the basis of ensuring the safety performance of the battery.

In general, during the charging process for the power battery, the negative electrode potential of the power battery gradually drops, and when the negative electrode potential of the power battery drops to a certain potential, the lithium plating phenomenon may occur. Take the lithium-ion battery with the graphite negative electrode system as an example, the electrode of the lithium-ion battery polarizes during the charging process, that is, the negative electrode potential drops while the positive electrode potential rises, and when the negative electrode potential drops to 0V (vs Li/Li$^+$), the lithium metal will precipitate on the surface of the negative electrode, which damages the performance of the battery and may cause thermal runaway and other safety accidents in serious cases.

Considering this problem, in embodiments of the present application, the higher the risk of lithium plating of the power battery, the higher the negative electrode potential safety threshold.

As an example, when the SOC of the power battery is in a first SOC interval, the negative electrode potential safety threshold is a first preset negative electrode potential safety threshold; and when the SOC of the power battery is in a second SOC interval, the negative electrode potential safety threshold is a second preset negative electrode potential safety threshold. Here, SOCs in the first SOC interval are less than SOCs in the second SOC interval, and the first preset negative electrode potential safety threshold is less than the second preset negative electrode potential safety threshold.

As another example, when the temperature of the power battery is in a first temperature interval, the negative electrode potential safety threshold is a third preset negative electrode potential safety threshold; and when the temperature of the power battery is in a second temperature interval, the negative electrode potential safety threshold is a fourth preset negative electrode potential safety threshold. Here, temperatures in the first temperature interval are less than temperatures in the second temperature interval, and the third preset negative electrode potential safety threshold is greater than the fourth preset negative electrode potential safety threshold.

As another example, when the SOH of the power battery is in a first SOH interval, the negative electrode potential safety threshold is a fifth preset negative electrode potential safety threshold; and when the SOH of the power battery is in a second SOH interval, the negative electrode potential safety threshold is a sixth preset negative electrode potential safety threshold. Here, SOHs in the first SOH interval are less than SOHs in the second SOH interval, and the fifth preset negative electrode potential safety threshold is greater than the sixth preset negative electrode potential safety threshold.

Examples of several negative electrode potential safety thresholds are shown in Tables 1-4. Here, the negative electrode potential safety threshold is in millivolts (mv). The SOH of the power battery in Table 1 is 95% to 100%, the SOH of the power battery in Table 2 is 90% to 95%, the SOH of the power battery in Table 3 is 85% to 90%, and the SOH of the power battery in Table 4 is less than 85%.

TABLE 1

| Temperature | SOC | | |
|---|---|---|---|
| | [0%, 40%) | [40%, 80%) | [80%, 100%] |
| [−10° C., 0° C.) | 10 | 15 | 25 |
| [0° C., 10° C.) | 8 | 12 | 20 |
| [10° C., 45° C.] | 5 | 10 | 15 |

TABLE 2

| Temperature | SOC | | |
|---|---|---|---|
| | [0%, 40%) | [40%, 80%) | [80%, 100%] |
| [−10° C., 0° C.) | 15 | 20 | 30 |
| [0° C., 10° C.) | 10 | 15 | 25 |
| [10° C., 45° C.] | 8 | 12 | 18 |

TABLE 3

| Temperature | SOC | | |
|---|---|---|---|
| | [0%, 40%) | [40%, 80%) | [80%, 100%] |
| [−10° C., 0° C.) | 18 | 25 | 35 |
| [0° C., 10° C.) | 15 | 20 | 30 |
| [10° C., 45° C.] | 10 | 15 | 20 |

TABLE 4

| Temperature | SOC | | |
|---|---|---|---|
| | [0%, 40%) | [40%, 80%) | [80%, 100%] |
| [−10° C., 0° C.) | 22 | 28 | 38 |
| [0° C., 10° C.) | 20 | 25 | 35 |
| [10° C., 45° C.] | 15 | 20 | 30 |

As can be seen from Tables 1-4, with other factors remaining unchanged, the larger the SOC of the power battery, the larger the negative electrode potential safety threshold. For example, in the case where the temperature of the power battery is in the range of [−10° C., 0° C.) and the SOH is 95% to 100%, the negative electrode potential safety threshold is 10 my when the SOC of the power battery is in the range of [0%, 40%); and the negative electrode potential safety threshold is 15 my when the SOC of the power battery is in the range of [40%, 80%).

As can also be seen from Tables 1-4, with other factors remaining unchanged, the lower the temperature of the power battery, the greater the negative electrode potential safety threshold. For example, in the case where the SOC of the power battery is in the range of [80%, 100%] and the SOH is 85% to 95%, the negative electrode potential safety threshold is my when the temperature of the power battery is in the range of [−10° C., 0° C.); and the negative electrode potential safety threshold is 30 my when the temperature of the power battery is in the range of [0° C., 10° C.).

As can also be seen from Tables 1-4, with other factors remaining unchanged, the smaller the SOH of the power battery, the larger the negative electrode potential safety threshold. For example, in the case where the SOC of the power battery is in the range of [0%, 40%) and the temperature is in the range of [−10° C., 0° C.), the negative electrode potential safety threshold is 18 my when the SOH of the power battery is 85% to 90%; and the negative electrode potential safety threshold is 15 my when the SOH of the power battery is 90% to 95%.

It should be understood that the specific examples herein are intended only to assist those skilled in the art to better understand the embodiments of the present application and are not intended to limit the scope of the embodiments of the present application.

In the above technical solution, the negative electrode potential safety threshold is set based on the degree of risk of lithium plating of the power battery. On the one hand, the negative electrode potential safety threshold corresponding to the power battery with high risk of lithium plating is set relatively large, which can effectively suppress the risk of lithium plating of the power battery and thus improve the safety performance of the power battery. On the other hand, the negative electrode potential safety threshold corresponding to the power battery with low risk of lithium plating is set relatively small, which can ensure the charging speed of the power battery without affecting the safety performance of the power battery.

Optionally, prior to determining the negative electrode potential safety threshold, the method 200 may also include: the BMS determines a first charging request current and sends the first charging request current to the charging pile. Specifically, the BMS may determine the first charging request current according to parameters such as the temperature, the SOC, the SOH, and the voltage of the power battery.

After the charging pile receives the first charging request current, the charging pile can charge the power battery based on the first charging request current.

Optionally, the first charging request current may be carried in, but not limited to, the battery charging requirement (BCL) message.

After determining the negative electrode potential safety threshold, the BMS can adjust the charging request current for the power battery based on the negative electrode potential of the power battery and the negative electrode potential safety threshold during the charging process for the power battery.

Specifically, during the charging process, if the negative electrode potential of the power battery drops to the negative electrode potential safety threshold, the BMS can reduce the charging request current for the power battery, that is, adjust the charging request current from the first charging request current to the second charging request current, the second charging current being less than the first charging current.

After adjusting the first charging request current to the second charging request current, the BMS can send the second charging request current to the charging pile to enable the charging pile to charge the power battery based on the second charging request current.

In the above technical solution, when the negative electrode potential of the power battery drops to the negative electrode potential safety threshold, it indicates that this power battery may be about to experience lithium plating, and reducing the charging request current for the power battery in this case can avoid the safety problem of the power battery caused by lithium ion aggregation and other problems, such as battery combustion or explosion, thus ensuring the safety performance of the power battery.

Alternatively, if the negative electrode potential of the power battery does not drop to the negative electrode potential safety threshold and the charging duration of the power battery is greater than the time threshold, which indicates that the charging request current for the current moment is small, then the BMS can increase the charging request current for the power battery, that is, adjusting the charging request current from the first charging request current to the third charging request current, the third charging request current being greater than the first charging request current.

Optionally, when the BMS sends the first charging request current to the charging pile, the BMS can start a timer of which the timing duration is the time threshold. After the timer times out, it indicates that the charging duration of the power battery is greater than the time threshold.

Optionally, the time threshold may be, but is not limited to, 30s.

After adjusting the first charging request current to the third charging request current, the BMS can send the third charging request current to the charging pile to enable the charging pile to charge the power battery based on the third charging request current.

In the above technical solution, if the negative electrode potential of the power battery does not drop to the negative electrode potential safety threshold for a long time, it indicates that the charging current for the power battery for the current moment is too small. Increasing the charging request current for the power battery in this case can increase the charging speed and greatly reduce the charging duration of the power battery, thereby improving the user experience.

It should be understood that in embodiments of the present application, "first", "second", and "third" are used only to distinguish different objects, but do not limit the scope of embodiments of the present application.

In embodiments of the present application, no specific limitation is imposed on the implementation for the BMS to acquire the negative electrode potential of the power battery. For example, the BMS can estimate the negative electrode potential of the power battery by a negative electrode potential estimation model, or the BMS can obtain the negative electrode potential of the power battery by means of actual measurement of the three-electrode battery with a reference electrode.

In one embodiment, for a two-electrode battery, the BMS can acquire the negative electrode potential by separating the positive and negative electrodes of the battery using a negative electrode potential estimation model. Here, the negative electrode potential estimation model may be, for example, an equivalent circuit model, an electrochemical model, and an equivalent circuit and electrochemical coupled model.

In another embodiment, the BMS can also acquire the negative electrode potential of the power battery by collecting the negative electrode potential of a three-electrode battery with a reference electrode and the potential of the reference electrode, wherein the three-electrode battery means that in addition to including the positive and negative electrodes of a conventional two-electrode battery, a new reference electrode is added, which is, for example, a lithium metal reference electrode, a lithium alloy reference electrode, or a copper wire in situ lithium-plated reference electrode, and so on.

Specifically, a polarization equivalent model for the three-electrode battery can be established first, wherein this polarization equivalent model may include positive and negative parameters to reflect the external and internal characteristics of the three-electrode battery to facilitate accurate prediction of the negative electrode potential. Here, the polarization equivalent model may include a Rint model, a polarization first-order RC equivalent circuit model, a polarization second-order RC equivalent circuit model, and so on.

Figure 3:
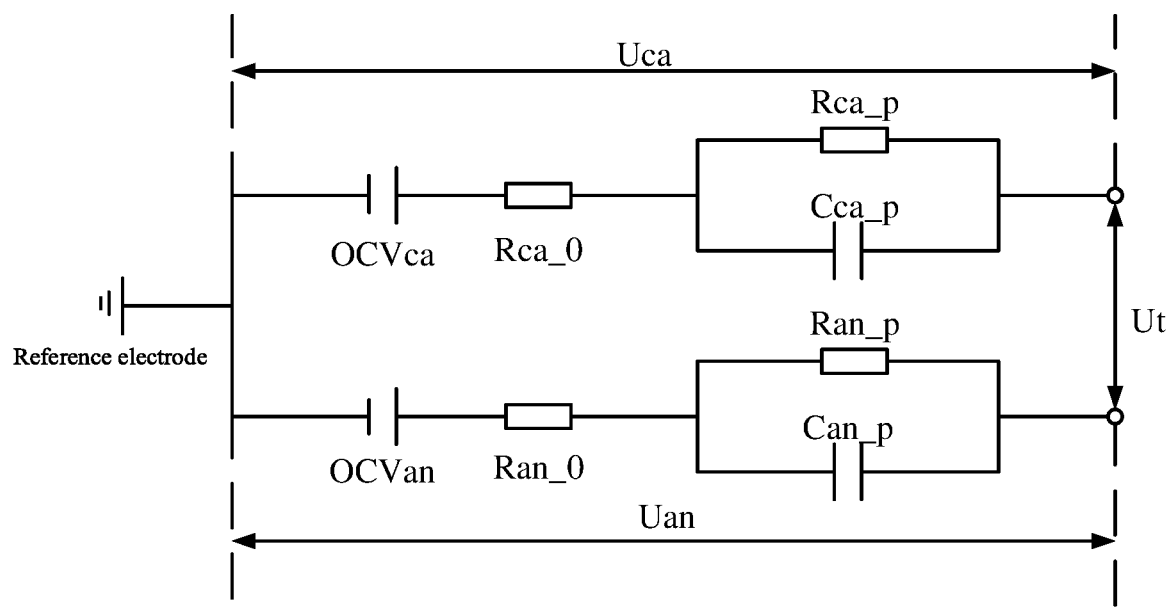
FIG. 3 is a schematic diagram of a polarization first-order RC equivalent circuit model of an embodiment of the present application.

FIG. 3 illustrates a schematic diagram of a polarization first-order RC equivalent circuit model of an embodiment of the present application. As shown in FIG. 3, Ut is the full battery terminal voltage; and Uca and Uan are the potential of the positive electrode relative to the reference electrode and the potential of the negative electrode relative to the reference electrode, respectively. OCVca and OCVan denote the open-circuit voltage of the positive electrode and the open-circuit voltage of the negative electrode, respectively; Rca_0 and Ran_0 denote the ohmic internal resistance of the positive electrode and the ohmic internal resistance of the negative electrode, respectively; Uca_p and Uan_p denote the polarization voltage of the positive electrode and the polarization voltage of the negative electrode, respectively; Rca_p and Ran_p denote the polarization internal resistance of the positive electrode and the polarization internal resistance of the negative electrode, respectively; Cca_p and Can_p denote the polarization capacitance of the positive electrode and the polarization capacitance of the negative electrode, respectively; and I denotes the current. Uca_p' and Uan_p' denote the derivatives of Uca_p and Uan_p, respectively.

First, the open-circuit voltage OCVca of the positive electrode and the open-circuit voltage OCVan of the negative electrode can be obtained from actual measurements, and then the model parameters Rca_0, Ran_0, Rca_p, Ran_p, Cca_p, and Can_p can be calibrated according to Equations (1)-(5) in combination with optimization algorithms, such as the least square method and genetic algorithms, and finally the negative electrode potential can be estimated using the extended Kalman filter algorithm, the proportional integral differential (PID) algorithm, or the Longaberger observer.

$$Ut = Uca - Uan \quad (1)$$

$$Uca = OCVca + I*Rca\_0 + Uca\_p \quad (2)$$

$$Uan = OCVan + I*Ran\_0 + Uan\_p \quad (3)$$

$$Uca\_p' = I/Cca\_p - Uca\_p/(Rca\_p*Cca\_p) \quad (4)$$

$$Uan\_p' = I/Can\_p - Uan\_p/(Ran\_p*Can\_p) \quad (5)$$

An embodiment for estimating the negative electrode potential using the extended Kalman filter algorithm will be briefly described below. The extended Kalman filter algorithm consists mainly of the state equation (6) and the observation equation (7), which are then combined with the recursion equations (8)-(12) to iteratively update the time and state so as to achieve state estimation.

$$X_{k+1} = A_k X_k + B_k U_k + Q_k \tag{6}$$

$$Y_k = C_k X_k + R_k \tag{7}$$

$$\hat{X}_k^- = A_{k-1} \hat{X}_{k-1} + B_{k-1} U_{k-1} \tag{8}$$

$$P_k^- = A_{k-1} P_{k-1} A_{k-1}^T + Q \tag{9}$$

$$K_k = P_k^- C_k^T (C_k P_k^- C_k^T + R)^{-1} \tag{10}$$

$$\hat{X}_k = \hat{X}_k^- + K_k (Y_k - C_k \hat{X}_k^- - D_k U_k) \tag{11}$$

$$P_k = (1 - K_k C_k) P_k^- \tag{12}$$

where X is the state quantity to be estimated, U is a controllable input quantity, Y is an output quantity, Q and R denote the systematic error and measurement error, respectively, P is the covariance matrix of the estimation error, the subscript k denotes the variable for the moment k, the subscript k−1 denotes the variable for the moment k−1, the subscript k+1 denotes the variable for the moment k+1, the superscript "^" denotes the estimated value, and the superscript T denotes the transpose operation on the matrix. P is the covariance matrix of the estimation error, for example, $P_k^-$ denotes the prior estimation covariance matrix for the moment k and P k denotes the posterior estimation covariance matrix for the moment k. A, B, C, and D are the coefficient matrices and $K_k$ is the Kalman gain.

The values of X, A, B, C, Q, and R are substituted into the above Equations:

$$X_k = \begin{bmatrix} SOC_k \\ Uan\_p_k \\ Uca\_p_k \\ Uan_k \end{bmatrix}$$

$$A_k = \begin{bmatrix} 1 & 0 & 0 & 0 \\ 0 & e^{-\left(\frac{dt}{Ran\_p*Can\_p}\right)} & 0 & 0 \\ 0 & 0 & e^{-\left(\frac{dt}{Rca\_p*Cca\_p}\right)} & 0 \\ d(OCVan_k)/d(SOC_k) & e^{-\left(\frac{dt}{Ran\_p*Can\_p}\right)} & 0 & 0 \end{bmatrix}$$

$$B_k = \begin{bmatrix} dt/(3600*Cap) \\ Ran\_p*\left(1 - e^{-\left(\frac{dt}{Ran\_p*Can\_p}\right)}\right) \\ Rca\_p*\left(1 - e^{-\left(\frac{dt}{Rca\_p*Cca\_p}\right)}\right) \\ Ran\_p*\left(1 - e^{-\left(\frac{dt}{Ran\_p*Can\_p}\right)}\right) + Ran\_0 \end{bmatrix}$$

$$C_k = \begin{bmatrix} d(OCVan_k + OCVca_k)/d(SOC_k) \\ 1 \\ 1 \\ 0 \end{bmatrix}$$

$$Q_k = \begin{bmatrix} 0 & 0 & 0 & 0 \\ 0 & 0 & 0 & 0 \\ 0 & 0 & 0 & 0 \\ 0 & 0 & 0 & 0 \end{bmatrix}$$

$$R_k = 0.01$$

That is, the negative electrode potential can be acquired by the negative electrode potential estimation equation:

$$Uan_k = \frac{d(OCVan_k)}{d(SOC_k)} * SOC_k +$$
$$Uan\_p_k * e^{-\left(\frac{dt}{Ran\_p*Can\_p}\right)} + Ran\_p * \left(1 - e^{-\left(\frac{dt}{Ran\_p*Can\_p}\right)}\right) + Ran_{-0}.$$

In some embodiments, the BMS may determine the adjusted current (e.g., the second charging request current or the third charging request current) through a predictive control algorithm. For example, the BMS can determine the adjusted current by a proportion integral differential (PID) control algorithm.

The BMS adjusting the first charging request current to the second charging request current is illustrated as an example. Specifically, the BMS can obtain the adjusted current by the following Equation:

$$I0_{k+1} = I0_k + \Delta I_k$$

$$\Delta I_k = k_p \Delta Uan_k + k_i \sum_{i=1}^{k} \Delta Uan_k + k_d (\Delta Uan_k - \Delta Uan_{k-1})$$

where $I0_{k+1}$ is the charging request current for the moment k+1, i.e., the second charging request current, $I0_k$ is the charging request current for the moment k, i.e., the first charging current, $\Delta Uan_k$ is the negative electrode potential safety threshold for the moment k, which may also be the negative electrode potential of the power battery for the moment k, $\Delta Uan_{k-1}$ is the negative electrode potential safety threshold for the moment k−1 or the negative electrode potential of the power battery for the moment k−1, and $k_p$, $k_i$, and $k_d$ are the proportional, integral, and differential parameters of the PID control algorithm, respectively. Exemplarily, $k_p$ may be 20, $k_i$ may be 5, and $k_d$ may be 70.

Figure 4:
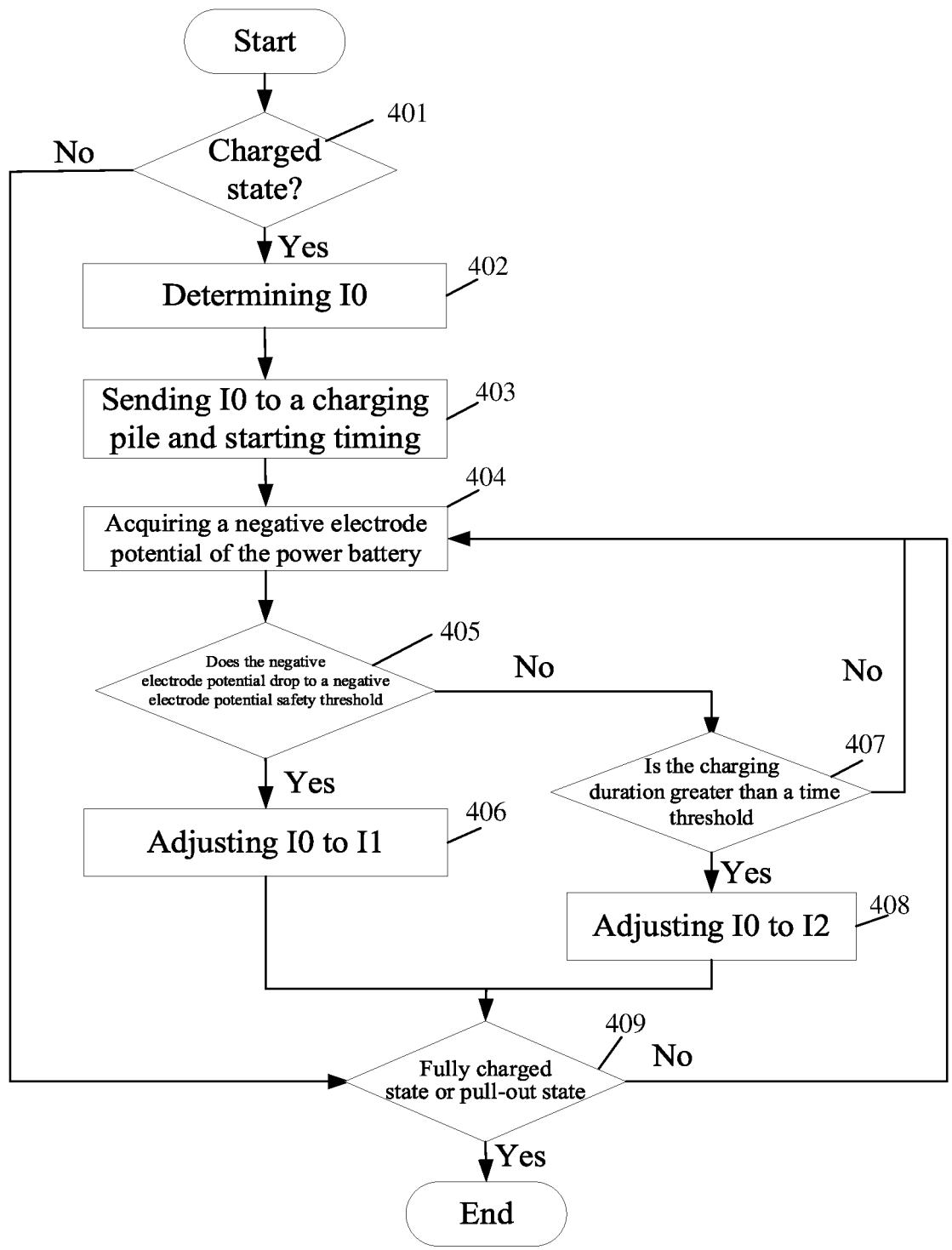
FIG. 4 is a schematic flowchart of a method for charging a power battery of an embodiment of the present application.

To more clearly understand the method 200 for charging a power battery of embodiments of the present application, a method for charging a power battery of a possible embodiment of the present application is described below in conjunction with FIG. 4.

In step 401, the BMS judges whether the power battery is in a charged state.

If the power battery is in the charged state, step 402 is executed; and if the power battery is not in the charged state, step 409 is executed.

In step 402, the BMS determines a charging request current I0 of the power battery.

Specifically, the BMS may first acquire parameters such as the SOC, the SOH, the temperature, and the voltage of the power battery, and determine I0 based on parameters such as the SOC, the SOH, the temperature, and the voltage of the power battery.

In step 403, the BMS sends the charging request current I0 to a charging pile to request charging and starts timing.

In step 404, the BMS acquires a negative electrode potential of the power battery.

In step 405, the BMS compares the negative electrode potential of the power battery with the negative electrode potential safety threshold and judges whether the negative electrode potential of the power battery drops to the negative electrode potential safety threshold.

If the negative electrode potential of the power battery drops to the negative electrode potential safety threshold, step 406 is executed; and if the negative electrode potential of the power battery does not drop to the negative electrode potential safety threshold, step 407 is executed.

In step 406, the BMS adjusts the charging request current I0 to the charging request current I1 and sends the adjusted charging request current I1 to the charging pile to enable the charging pile to charge the power battery based on I1.

In step 407, the BMS judges whether a charging duration of the power battery is greater than a time threshold.

If the charging duration is greater than the time threshold, the BMS executes step 408; and if the charging duration is less than the time threshold, the BMS executes step 404.

In step 408, the BMS adjusts the charging request current I0 to the charging request current I2 and sends the adjusted charging request current I2 to the charging pile to enable the charging pile to charge the power battery based on I2.

In step 409, the BMS judges whether the power battery is in a fully charged state or a pull-out state.

If the power battery is in the fully charged state or the pull-out state, the charging process is finished; and if the power battery is not in the fully charged state or the pull-out state, the BMS continues to execute step 404.

In embodiments of the present application, since the risk level of lithium plating of the power battery is closely related to its own battery state parameter, the above technical solution determines the negative electrode potential safety threshold according to the battery state parameter of the power battery, so that the determined negative electrode potential safety threshold can be more accurate and closer to the critical potential of lithium plating of the power battery. In this way, the charging request current for the power battery is adjusted based on the determined negative electrode potential safety threshold and the negative electrode potential of the power battery, which not only ensures the safety performance of the power battery, but also improves the charging speed of the power battery.

The method embodiments of the present application have been described in detail above, and the apparatus embodiment of the present application will be described below. The apparatus embodiment corresponds to the method embodiments, so for the part not described in detail, reference can be made to the previous method embodiments, and the apparatus can implement any of the above methods that may be implemented.

Figure 5:
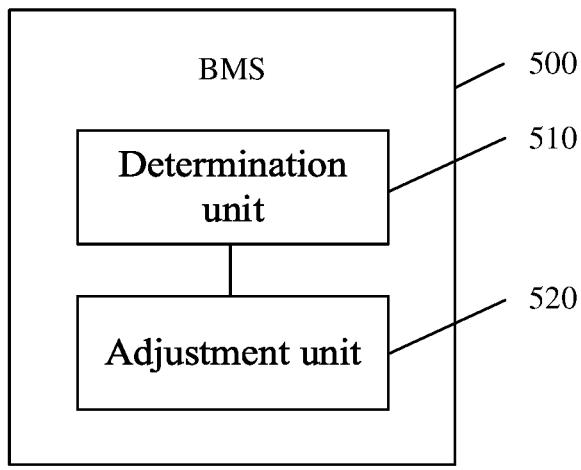
FIG. 5 is a schematic block diagram of a BMS of an embodiment of the present application.

FIG. 5 illustrates a schematic block diagram of a BMS 500 of an embodiment of the present application. This BMS 500 may perform the method 200 for charging a power battery of the above embodiment of the present application. As shown in FIG. 5, this BMS 500 may include:

a determination unit 510 for determining a negative electrode potential safety threshold according to a battery state parameter of the power battery, the battery state parameter comprising at least one of the state of charge (SOC), the temperature, and the state of health (SOH) of the power battery; and an adjustment unit 520 for adjusting a charging request current for the power battery based on a negative electrode potential of the power battery and the negative electrode potential safety threshold during a charging process for the power battery.

Optionally, in an embodiment of the present application, the adjustment unit 520 is specifically used for: adjusting the charging request current from a first charging request current to a second charging request current if the negative electrode potential drops to the negative electrode potential safety threshold, the second charging request current being less than the first charging request current.

Optionally, in an embodiment of the present application, the adjustment unit 520 is specifically used for: adjusting the charging request current from a first charging request current to a third charging request current if the negative electrode potential does not drop to the negative electrode potential safety threshold and a charging duration of the power battery is greater than a time threshold, the third charging request current being greater than the first charging request current.

Optionally, in an embodiment of the present application, when the SOC of the power battery is in a first SOC interval, the negative electrode potential safety threshold is a first preset negative electrode potential safety threshold; and when the SOC of the power battery is in a second SOC interval, the negative electrode potential safety threshold is a second preset negative electrode potential safety threshold, wherein SOCs in the first SOC interval are less than SOCs in the second SOC interval, and the first preset negative electrode potential safety threshold is less than the second preset negative electrode potential safety threshold.

Optionally, in an embodiment of the present application, when the temperature of the power battery is in a first temperature interval, the negative electrode potential safety threshold is a third preset negative electrode potential safety threshold; and when the temperature of the power battery is in a second temperature interval, the negative electrode potential safety threshold is a fourth preset negative electrode potential safety threshold, wherein temperatures in the first temperature interval are less than temperatures in the second temperature interval, and the third preset negative electrode potential safety threshold is greater than the fourth preset negative electrode potential safety threshold.

Optionally, in an embodiment of the present application, when the SOH of the power battery is in a first SOH interval, the negative electrode potential safety threshold is a fifth preset negative electrode potential safety threshold; and when the SOH of the power battery is in a second SOH interval, the negative electrode potential safety threshold is a sixth preset negative electrode potential safety threshold, wherein SOHs in the first SOH interval are less than SOHs in the second SOH interval, and the fifth preset negative electrode potential safety threshold is greater than the sixth preset negative electrode potential safety threshold.

Optionally, in an embodiment of the present application, the battery state parameter of the power battery is a battery state parameter of the power battery before charging.

Optionally, in an embodiment of the present application, the battery state parameter of the power battery is a battery state parameter of the power battery during the charging process.

It should be understood that this BMS 500 can implement the corresponding operations of the BMS in the method 200 and will not be repeated herein for brevity. Accordingly, this BMS 500 can achieve the same technical effect as the aforementioned method 200, which will not be described herein for the sake of brevity of content.

Figure 6:
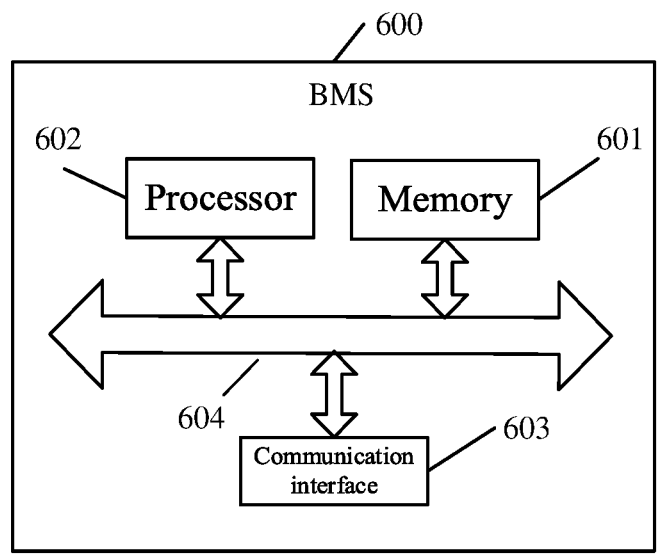
FIG. 6 is a schematic block diagram of a BMS of an embodiment of the present application.

FIG. 6 is a schematic diagram of the hardware structure of a BMS of embodiments of the present application. The BMS 600 includes a memory 601, a processor 602, a communication interface 603, and a bus 604. Among them, the memory 601, the processor 602, and the communication interface 603 are communicatively connected to each other via the bus 604.

The memory 601 may be a read-only memory (ROM), a static storage device, and a random access memory (RAM). The memory 601 may store a program, and when the program stored in the memory 601 is executed by the processor 602, the processor 602 and the communication interface 603 are used to perform the various steps of the method for charging a power battery of embodiments of the present application.

The processor 602 may employ a general purpose central processing unit (CPU), a microprocessor, an application specific integrated circuit (ASIC), a graphics processing unit (GPU) or one or more integrated circuits for executing the relevant programs, so as to implement the functions required to be performed by the units in the apparatus of embodiments of the present application, or to implement the method for charging a power battery of embodiments of the present application.

The processor 602 may also be an integrated circuit chip that has a processing capability for signals. During implementation, the various steps of the method for charging a power battery of embodiments of the present application may be accomplished by integrated logic circuitry of the hardware in the processor 602 or by instructions in the form of software.

The above processor 602 may also be a general purpose processor, a digital signal processor (DSP), an ASIC, a field programmable gate array (FPGA) or other programmable logic devices, discrete gates or transistor logic devices, discrete hardware components. The methods, steps, and logical block diagrams as disclosed in embodiments of the present application can be implemented or performed. The general purpose processor may be a microprocessor, or the processor may also be any conventional processor, etc. The steps of the method disclosed in conjunction with the embodiments of the present application can be directly embodied as being performed by the hardware processor or being performed with a combination of hardware and software modules in the processor. The software module may be located in a random access memory, a flash memory, a read-only memory, a programmable read-only memory or an electrically rewritable programmable memory, a register, and other storage media well established in the art. The storage medium is located in the memory 601 and the processor 602 reads the information in the memory 601 and, in combination with its hardware, performs the functions required to be performed by the units included in the BMS of embodiments of the present application, or performs the method for charging a power battery of embodiments of the present application.

The communication interface 603 uses, for example, but not limited to, a transceiving apparatus such as a transceiver to enable communication between the BMS 600 and other devices or communication networks. For example, the BMS 600 can send charging request information to the charging pile via the communication interface 603.

The bus 604 may include a pathway for transmitting information between various components (e.g., the memory 601, the processor 602, and the communication interface 603) of the BMS 600.

It should be noted that although the BMS 600 described above illustrates only the memory, the processor, and the communication interface, during specific implementation, it should be understood by those skilled in the art that the BMS 600 may also include other devices necessary to achieve normal operation. Meanwhile, depending on the specific needs, those skilled in the art should understand that the BMS 600 may also include hardware devices that implement other additional functions. Further, it should be understood by those skilled in the art that the BMS 600 may also include only those devices necessary to implement embodiments of the present application, and need not include all of the devices shown in FIG. 6.

Embodiments of the present application also provide a computer-readable storage medium storing program code for execution by a device, the program code comprising instructions for performing the steps in the method for charging a power battery described above.

Embodiments of the present application further provide a computer program product comprising a computer program stored on a computer-readable storage medium, wherein the computer program comprising program instructions that, when executed by a computer, cause the computer to perform the method for charging a power battery as described above.

The computer-readable storage medium described above may be a transitory computer-readable storage medium or a non-transitory computer-readable storage medium.

It should be understood that in the various embodiments of the present application, the values of the serial numbers of the processes does not imply the order of execution, and the order in which the processes are performed shall be determined by their functions and intrinsic logic, and shall not constitute any limitation to the implementation process of the embodiments of the present application.

It should also be understood that the various implementations described in this specification may be implemented individually or in combination, which is not limited in the embodiments of the present application.

Although the present application has been described with reference to the preferred embodiments, various improvements can be made thereto and components thereof can be replaced with equivalents without departing from the scope of the present application. In particular, the technical features mentioned in the various embodiments can be combined in any manner as long as there is no structural conflict. The present application is not limited to the specific embodiments disclosed herein, but rather includes all technical solutions falling within the scope of the claims.

What is claimed is:

1. A method for charging a power battery, wherein the method is applied to a battery management system (BMS) for the power battery, the method comprising:

determining a negative electrode potential safety threshold according to a battery state parameter of the power battery, the battery state parameter comprising at least one of the state of charge (SOC), the temperature, and the state of health (SOH) of the power battery; and adjusting a charging request current for the power battery based on a negative electrode potential of the power battery and the negative electrode potential safety threshold during a charging process for the power battery;

wherein adjusting the charging request current for the power battery based on the negative electrode potential of the power battery and the negative electrode potential safety threshold comprises:

adjusting the charging request current from a first charging request current to a second charging request current when the negative electrode potential drops to the negative electrode potential safety threshold, the second charging request current being less than the first charging request current; or adjusting the charging request current from a first charging request current to a third charging request current when the negative electrode potential does not drop to the negative electrode potential safety threshold and a charging duration of the power battery is greater than a time threshold, the third charging request current being greater than the first charging request current.

2. The method according to claim 1, wherein
when the SOC of the power battery is in a first SOC interval, the negative electrode potential safety threshold is a first preset negative electrode potential safety threshold; and
when the SOC of the power battery is in a second SOC interval, the negative electrode potential safety threshold is a second preset negative electrode potential safety threshold;
wherein SOCs in the first SOC interval are less than SOCs in the second SOC interval, and the first preset negative electrode potential safety threshold is less than the second preset negative electrode potential safety threshold.

3. The method according to claim 1, wherein
when the temperature of the power battery is in a first temperature interval, the negative electrode potential safety threshold is a third preset negative electrode potential safety threshold; and
when the temperature of the power battery is in a second temperature interval, the negative electrode potential safety threshold is a fourth preset negative electrode potential safety threshold;
wherein temperatures in the first temperature interval are less than temperatures in the second temperature interval, and the third preset negative electrode potential safety threshold is greater than the fourth preset negative electrode potential safety threshold.

4. The method according to claim 1, wherein
when the SOH of the power battery is in a first SOH interval, the negative electrode potential safety threshold is a fifth preset negative electrode potential safety threshold; and
when the SOH of the power battery is in a second SOH interval, the negative electrode potential safety threshold is a sixth preset negative electrode potential safety threshold;
wherein SOHs in the first SOH interval are less than SOHs in the second SOH interval, and the fifth preset negative electrode potential safety threshold is greater than the sixth preset negative electrode potential safety threshold.

5. The method according to claim 1, wherein the battery state parameter of the power battery is a battery state parameter of the power battery before charging.

6. The method according to claim 1, wherein the battery state parameter of the power battery is a battery state parameter of the power battery during the charging process.

7. A battery management system for a power battery, comprising:
a determination unit, configured to determine a negative electrode potential safety threshold according to a battery state parameter of the power battery, the battery state parameter comprising at least one of the state of charge (SOC), the temperature, and the state of health (SOH) of the power battery; and
an adjustment unit, configured to adjust a charging request current for the power battery based on a negative electrode potential of the power battery and the negative electrode potential safety threshold during a charging process for the power battery;
wherein in adjusting the charging request current, the adjustment unit is configured to:
adjust the charging request current from a first charging request current to a second charging request current when the negative electrode potential drops to the negative electrode potential safety threshold, the second charging request current being less than the first charging request current; or
adjust the charging request current from a first charging request current to a third charging request current when the negative electrode potential does not drop to the negative electrode potential safety threshold and a charging duration of the power battery is greater than a time threshold, the third charging request current being greater than the first charging request current.

8. The battery management system according to claim 7, wherein
when the SOC of the power battery is in a first SOC interval, the negative electrode potential safety threshold is a first preset negative electrode potential safety threshold; and
when the SOC of the power battery is in a second SOC interval, the negative electrode potential safety threshold is a second preset negative electrode potential safety threshold;
wherein SOCs in the first SOC interval are less than SOCs in the second SOC interval, and the first preset negative electrode potential safety threshold is less than the second preset negative electrode potential safety threshold.

9. The battery management system according to claim 7, wherein
when the temperature of the power battery is in a first temperature interval, the negative electrode potential safety threshold is a third preset negative electrode potential safety threshold; and
when the temperature of the power battery is in a second temperature interval, the negative electrode potential safety threshold is a fourth preset negative electrode potential safety threshold;
wherein temperatures in the first temperature interval are less than temperatures in the second temperature interval, and the third preset negative electrode potential safety threshold is greater than the fourth preset negative electrode potential safety threshold.

10. The battery management system according to claim 7, wherein
when the SOH of the power battery is in a first SOH interval, the negative electrode potential safety threshold is a fifth preset negative electrode potential safety threshold; and
when the SOH of the power battery is in a second SOH interval, the negative electrode potential safety threshold is a sixth preset negative electrode potential safety threshold;
wherein SOHs in the first SOH interval are less than SOHs in the second SOH interval, and the fifth preset negative electrode potential safety threshold is greater than the sixth preset negative electrode potential safety threshold.

11. The battery management system according to claim 7, wherein the battery state parameter of the power battery is a battery state parameter of the power battery before charging.

12. The battery management system according to claim 7, wherein the battery state parameter of the power battery is a battery state parameter of the power battery during the charging process.

13. A battery management system for a power battery, comprising a processor and a memory, wherein the memory is used for storing a computer program, and the processor is used for invoking the computer program to execute a method for charging a power battery that comprises:
- determining a negative electrode potential safety threshold according to a battery state parameter of the power battery, the battery state parameter comprising at least one of the state of charge (SOC), the temperature, and the state of health (SOH) of the power battery; and
- adjusting a charging request current for the power battery based on a negative electrode potential of the power battery and the negative electrode potential safety threshold during a charging process for the power battery;
- wherein adjusting the charging request current for the power battery based on the negative electrode potential of the power battery and the negative electrode potential safety threshold comprises:
- adjusting the charging request current from a first charging request current to a second charging request current when the negative electrode potential drops to the negative electrode potential safety threshold, the second charging request current being less than the first charging request current; or
- adjusting the charging request current from a first charging request current to a third charging request current when the negative electrode potential does not drop to the negative electrode potential safety threshold and a charging duration of the power battery is greater than a time threshold, the third charging request current being greater than the first charging request current.

* * * * *